United States Patent
Pai et al.

(10) Patent No.: US 11,599,616 B2
(45) Date of Patent: Mar. 7, 2023

(54) BIOMETRIC OVERRIDE FOR INCORRECT FAILED AUTHORIZATION

(71) Applicant: Capital One Services, LLC, McLean, VA (US)

(72) Inventors: Aditya Pai, San Francisco, CA (US); Brice Elder, Mishawaka, IN (US); Julie Murakami, New York, NY (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 17/247,572

(22) Filed: Dec. 16, 2020

(65) Prior Publication Data

US 2022/0188391 A1     Jun. 16, 2022

(51) Int. Cl.
    *G06F 21/32* (2013.01)
(52) U.S. Cl.
    CPC .................. *G06F 21/32* (2013.01)
(58) Field of Classification Search
    None
    See application file for complete search history.

(56) References Cited

U.S. PATENT DOCUMENTS

| | | | |
|---|---|---|---|
| 2015/0058220 A1 | 2/2015 | Cazanas et al. | |
| 2015/0234808 A1* | 8/2015 | Miyata | G06V 40/50 704/10 |
| 2017/0186003 A1 | 6/2017 | Monaghan | |
| 2020/0334678 A1 | 10/2020 | Dutt et al. | |

OTHER PUBLICATIONS

Extended European Search Report for Application No. EP21214820, dated May 11, 2022, 8 pages.

* cited by examiner

*Primary Examiner* — Nicholas J Lee
(74) *Attorney, Agent, or Firm* — Harrity & Harrity, LLP

(57) ABSTRACT

In some implementations, an authorization device generate a decision to reject an authorization request that includes a credential associated with a user based on one or more inconsistencies between entity information provided in the authorization request and authorized entity information associated with the credential. The authorization device may transmit, to a biometric-enabled device associated with the user, a message that causes the biometric-enabled device to display a prompt indicating the one or more inconsistencies between the entity information provided in the authorization request and the authorized entity information associated with the credential. In some implementations, the prompt may further enable the user to provide a biometric input to authorize the entity information provided in the authorization request. The authorization device may grant the authorization request based on receiving information indicating that the user provided the biometric input to authorize the entity information provided in the authorization request.

20 Claims, 6 Drawing Sheets

BIOMETRIC OVERRIDE FOR INCORRECT FAILED AUTHORIZATION

BACKGROUND

In information security, authentication refers to techniques used to prove or otherwise verify an assertion, such as the identity of a user. For example, in some cases, authentication may be performed using biometrics, which generally include body measurements and/or calculations that relate to distinctive, measurable human characteristics. Biometric traits that are used for authentication are typically universal (e.g., every person possesses the trait), unique (e.g., the trait is sufficiently different to distinguish different individuals), and/or permanent (e.g., the trait does not significantly vary over time). Accordingly, because a biometric identifier is unique to a specific individual, biometrics can provide a more reliable and secure mechanism to verify a user identity and determine whether to grant the user access to systems, devices, and/or data relative to passwords and/or security tokens that may be lost, forgotten, or otherwise compromised (e.g., stolen or guessed by a malicious user).

SUMMARY

In some implementations, a system for enabling a biometric override for a failed authorization attempt includes one or more memories and one or more processors, communicatively coupled to the one or more memories, configured to: reject an authorization request that includes a credential associated with a user based on one or more inconsistencies between entity information provided in the authorization request and authorized entity information associated with the credential; transmit, to a device associated with the user, a message prompting the user to provide a biometric input to authorize the entity information provided in the authorization request, wherein the message causes the device to display an interface indicating that the authorization request was rejected based on the one or more inconsistencies between the entity information provided in the authorization request and the authorized entity information associated with the credential; and update the authorized entity information associated with the credential to include the entity information provided in the authorization request based on the user providing the biometric input to authorize the entity information provided in the authorization request.

In some implementations, a method for enabling a biometric override for a failed authorization attempt includes receiving, by an authorization device, an authorization request that includes a credential associated with a user; generating, by the authorization device, a decision to reject the authorization request based on one or more inconsistencies between entity information provided in the authorization request and authorized entity information associated with the credential; transmitting, by the authorization device, to a biometric-enabled device associated with the user, a message that causes the biometric-enabled device to display a prompt indicating the one or more inconsistencies between the entity information provided in the authorization request and the authorized entity information associated with the credential, wherein the prompt further enables the user to provide a biometric input to authorize the entity information provided in the authorization request; and granting, by the authorization device, the authorization request based on receiving information indicating that the user provided the biometric input to authorize the entity information provided in the authorization request.

In some implementations, a non-transitory computer-readable medium storing a set of instructions includes one or more instructions that, when executed by one or more processors of a user device, cause the user device to: receive, from an authorization device, a message indicating one or more inconsistencies in entity information associated with an attempted authorization request using a credential associated with a user of the user device; display a prompt enabling the user to provide a biometric input to authorize the entity information associated with the attempted authorization request; receive biometric data from one or more sensors on the user device; and transmit, to the authorization device, a request to authorize the entity information associated with the attempted authorization request based on the biometric data, wherein the request causes the authorization device to update authorized entity information associated with the credential to include the entity information associated with the attempted authorization request.

DETAILED DESCRIPTION

Figure 1A:
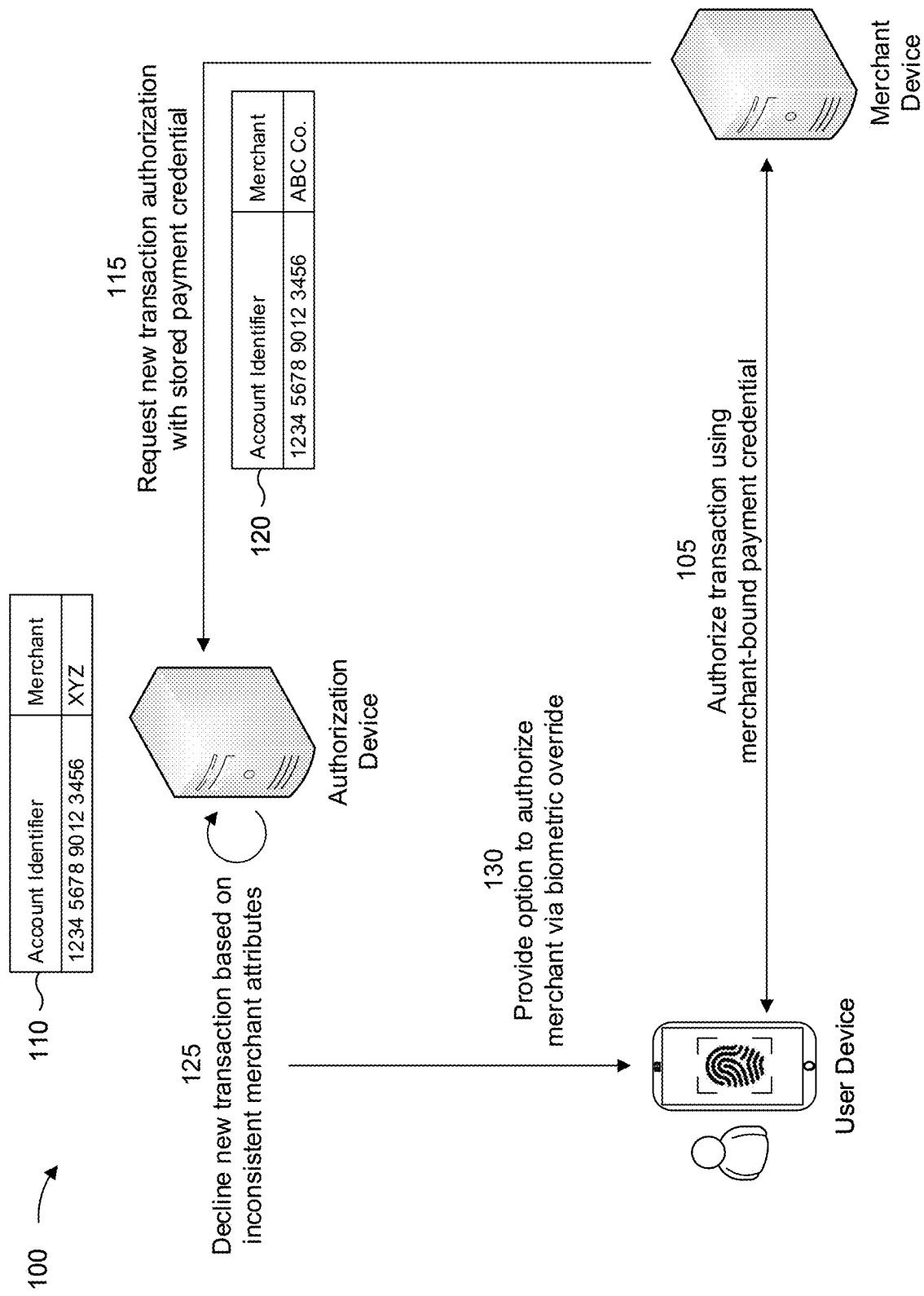
FIGS. 1A-1B are diagrams of an example implementation relating to a biometric override for an incorrect failed authorization.

The following detailed description of example implementations refers to the accompanying drawings. The same reference numbers in different drawings may identify the same or similar elements.

A virtual credential, sometimes referred to as a virtual payment credential, a virtual card number, and/or a virtual credit card, among other examples, is a computer-generated version of a primary payment credential (e.g., a credit card number). The virtual credential may be linked to the primary payment credential and used as a substitute for the primary payment credential in a transaction. For example, a bank may issue a transaction card (e.g., a credit card), and a transaction management system (e.g., a transaction backend system) of the bank may also issue one or more virtual card numbers that can be used with different merchant transaction systems. In this case, the transaction management system may configure each virtual credential to be associated with a particular merchant. For example, a first virtual credential may be usable with a first merchant only, a second virtual credential may be useable with a second merchant only, and so on. Each virtual credential may be linked to the primary credential in the transaction management system to enable transactions using a particular virtual credential to be charged to an account associated with the primary credential.

Accordingly, because virtual credentials can generally be used in the same way as an actual credit card (e.g., except in cases where a physical credit card has to be swiped or presented in order to verify an identity), virtual credentials can offer increased security in transactions that use stored credentials. For example, a stored credential (or card-on-file)

generally refers to a payment method, such as a credit card number and/or associated information (e.g., an expiration date, security code, and/or billing address), that a merchant may store and save for future transactions. For example, in a consumer-initiated transaction, a consumer may provide a merchant with payment credentials in order to actively enter into a transaction (e.g., an in-person transaction at a point-of-sale and/or an online transaction at a merchant website, among other examples). In some cases, the consumer may elect to save the payment credentials to avoid having to re-enter the payment credentials for subsequent consumer-initiated transactions and/or to authorize merchant-initiated transactions using the stored credentials (e.g., for a recurring or automatic payment, such as a subscription, a utility payment, and/or an account top-up).

In general, using a virtual credential as a stored credential can provide additional security and robustness against fraud relative to using the actual payment credential. For example, if a security breach at a particular merchant were to result in a first virtual credential being exposed or otherwise compromised (e.g., to a hacker or fraudster), the virtual credential could be used only at the particular merchant and would be unusable with any other merchant(s). In this way, using the virtual credential as the stored credential may reduce a risk and/or an extent to which the virtual credential can be fraudulently used, thereby improving information security and/or reducing monetary losses relative to use of a regular payment credential. In such a case, the compromised virtual credential may be invalidated and a new virtual credential may be generated without affecting the primary payment credential and/or any other virtual credentials that may be linked to the primary payment credential. Furthermore, virtual credentials may provide similar protection against phishing scams or other fraud or abuse by unscrupulous merchants. This may minimize an inconvenience associated with issuing a new primary payment credential and may reduce utilization of network resources associated with updating many different merchant systems with new payment credentials.

Although binding a virtual credential to a particular merchant can improve security and/or reduce a risk of credit card fraud, in some cases the binding to a particular merchant may result in incorrect decisions to reject an authorization request using a virtual credential. For example, when a merchant requests authorization for a transaction using a stored payment credential, the merchant may provide one or more merchant attributes (e.g., a merchant name or other merchant identifier) together with information related to the stored payment credential. Accordingly, in cases where there are inconsistencies in the merchant attribute(s) associated with an authorization request using a stored virtual credential, the authorization request may be rejected because the merchant attribute differs from the merchant attribute stored by an authorization device in association with the virtual credential. However, in some cases, a discrepancy in the merchant attributes may not necessarily reflect fraud or misuse of the virtual credential. For example, merchants may be associated with entities that enter into various transactions that result in a change in attribute (e.g., a first company being acquired by another company, becoming an affiliate of another company, and/or changing a corporate name, among other examples). More generally, there may be various edge cases and/or merchant-specific variations in how transactions are requested and processed, which may result in inconsistent merchant attributes across different transactions, which may potentially result in false or incorrect decisions to decline a transaction request when using merchant-bound payment methods such as virtual credentials. Accordingly, the inconvenience of false or incorrect decline decisions may drive users away from using virtual credentials, which can increase the risk and/or exposure to fraud. Additionally, or alternatively, the false or incorrect decline decisions may require multiple communications to resolve (e.g., the consumer may need to contact a bank to update the merchant attributes and/or reinstate an invalidated virtual credential and/or the merchant may have to reissue the transaction request, among other examples), which can lead to significant resource consumption.

Some implementations described herein may enable a biometric override for a failed authorization attempt using a merchant-bound payment credential, such as a virtual card number and/or a virtual credential. For example, when a user enters into a transaction with a merchant, the user may provide the merchant with a payment credential that is valid only for the merchant and unusable with any other merchants. In some implementations, when a merchant requests a new transaction authorization (e.g., for a subsequent consumer-initiated transaction and/or a merchant-initiated transaction that relies on an original authentication), a device associated with the merchant (referred to hereinafter as a "merchant device") may transmit a request that includes the payment credential and one or more merchant attributes to an authorization device. Accordingly, in cases where there are inconsistencies between the merchant attribute provided with the request and authorized merchant attribute associated with the payment credential, the authorization device may transmit a message enabling the user to provide a biometric override to a device associated with the user (referred to hereinafter as a "user device").

For example, the message may indicate that the transaction request was declined, rejected, and/or temporarily delayed due to the inconsistent merchant attributes, and the merchant attribute may be updated based on the user providing a biometric input to authorize the transaction (e.g., a fingerprint identification, a facial recognition, and/or a behavioral biometric, among other examples). In this way, the transaction may be properly authorized (e.g., after the temporary hold or a new request) and subsequent transactions using the same or similar merchant attributes may be authorized based on the biometric override. In this way, the biometric override may provide security against fraudulent use of a merchant-bound payment credential (e.g., in cases where the user does not provide a biometric input and/or indicates that the different merchant attributes are not authorized) while also enabling authorized transactions to be completed. As a result, the biometric override may conserve computing resources and/or network resources that would otherwise be wasted by generating incorrect decisions to reject an authorization request due to a discrepancy in merchant attributes and/or unnecessarily invalidating and/or reinstating merchant-bound payment credentials, among other examples.

Figure 1B:
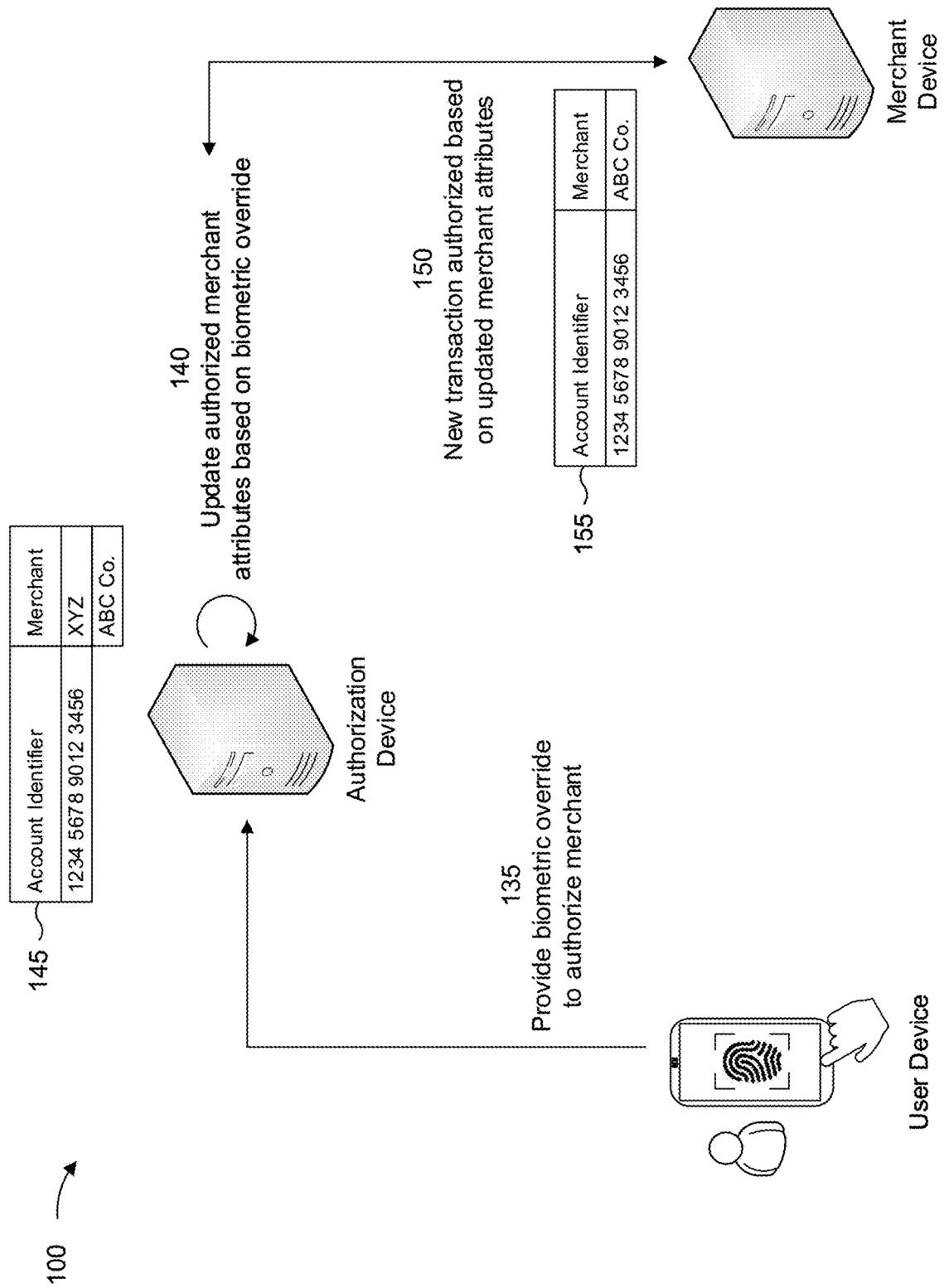

FIGS. 1A-1B are diagrams of an example 100 associated with a biometric override for an incorrect failed authorization. As shown in FIGS. 1A-1B, example 100 includes a user device, a merchant device, and an authorization device. The user device, the merchant device, and the authorization device devices are described in more detail in connection with FIG. 2 and FIG. 3.

As shown in FIG. 1A, and by reference number 105, the user device may communicate with the merchant device to authorize a transaction using a merchant-bound payment credential. For example, in some implementations, the merchant-bound payment credential may be a virtual credential, sometimes referred to as a virtual credit card or a virtual card number, that is valid only for a particular entity (e.g., an entity, such as a merchant, associated with the merchant device). In some implementations, the user device may communicate with a device associated with a financial institution, such as a bank or credit card provider, to request the merchant-bound payment credential. For example, the user device may indicate one or more attributes associated with the entity associated with the merchant device, which may be used to generate a payment credential that is linked to a primary payment credential associated with the user device and is valid only for the entity associated with the merchant device.

The device associated with the financial institution may include, or may be associated with, the authorization device, which may store information related to the merchant-bound payment credential, including an attribute of the authorized entity associated with the merchant-bound payment credential. For example, as shown by reference number 110, the authorization device may store an account identifier (e.g., a virtual card number) and a merchant attribute (e.g., an identifier, such as a merchant identifier or entity identifier) for which the merchant-bound payment credential is valid. Furthermore, in some implementations, the authorized merchant attributes may include one or more known variants. For example, a particular merchant may have a registered company name (e.g., "XYZ"), one or more registered websites (e.g., "xyz.com"), and/or variants thereof (e.g., "XYZ Corp." and/or "shop.xyz.com", among other examples). In some implementations, the authorization device may search one or more data sources of merchant information to identify the known variants of the merchant attributes provided by the user device in order to populate the authorized merchant attributes for the merchant-bound payment credential.

Accordingly, based on the user device requesting and receiving information related to the merchant-bound payment credential, the user device may communicate with the merchant device to initiate a transaction using the merchant-bound payment credential. For example, the merchant-bound payment credential may be stored in a digital wallet or other secure memory of the user device for use in making in-person transactions at a point-of-sale (PoS). In this case, the merchant device may be a transaction terminal or another suitable device that is capable of accepting payment information using the merchant-bound payment credential stored in the digital wallet or other secure memory of the user device. Additionally, or alternatively, the merchant device may be a server or another device that enables the user device to complete an online transaction using the merchant-bound payment credential. In either case, the merchant device may receive information associated with the merchant-bound payment credential from the user device (e.g., an account identifier, expiration date, security code, and/or billing address), and may transmit a request to authorize a transaction using the merchant-bound payment credential to the authorization device. For example, the request may be an authorization request that includes the information associated with the merchant-bound payment credential and one or more attributes (e.g., an identifier) associated with a merchant requesting the authorization. The authorization device may authorize the transaction based on verifying that the merchant attributes match the authorized merchant attributes associated with the merchant-bound payment credential and may charge the transaction to a primary account linked to the merchant-bound payment credential.

As further shown in FIG. 1A, and by reference number 115, the merchant device may request a new transaction authorization using a stored payment credential. For example, in some implementations, an initial transaction that the user device authorizes using the merchant-bound payment credential may be associated with a recurring payment (e.g., a subscription or a periodic installment account) or an automatic payment that is triggered when one or more conditions are satisfied (e.g., to increase a merchant-specific account balance when the balance falls below or otherwise fails to satisfy a threshold). Accordingly, when the user of the user device authorizes the initial transaction, the user may indicate that the merchant-bound payment credential is to be stored by the merchant device and saved for subsequent merchant-initiated transactions (e.g., for recurring or automatic payments). Additionally, or alternatively, the user may indicate that the merchant-bound payment credential is to be stored by the merchant device and saved for subsequent consumer-initiated transactions (e.g., using a card-on-file to avoid having to re-enter payment credentials for each transaction with the merchant device). Furthermore, when the merchant device requests the new transaction authorization using the stored merchant-bound payment credential, the merchant device may transmit, to the authorization device, information associated with the merchant-bound payment credential and one or more attributes (e.g., an identifier) associated with the merchant device. However, in some cases, attributes associated with the merchant device may have changed since the initial (or another earlier) transaction. For example, as shown by reference number 120, the new transaction authorization request may indicate a merchant identifier of "ABC Co.," which differs from the "XYZ" authorized merchant attributes associated with the merchant-bound payment credential.

Accordingly, as further shown in FIG. 1A, and by reference number 125, the authorization device may decline or otherwise reject the request to authorize the new transaction based on one or more inconsistencies in the merchant attribute associated with the merchant-bound payment credential. For example, in some implementations, the authorization device may generate a decision that the request for the new transaction authorization is to be rejected or declined based on the merchant attribute provided with the request having inconsistencies with respect to the authorized merchant attribute associated with the merchant-bound payment credential. Although the discrepancy in the merchant attribute may be indicative of fraud or other unauthorized use of the merchant-bound payment credential, in some cases the inconsistent merchant attribute may be caused by a change in an organizational structure for an entity associated with the merchant device or other merchant-specific variations in transaction processing. For example, the entity associated with the merchant device may have changed names, been acquired by a different entity, and/or become an affiliate of a different entity, among other examples. Additionally, or alternatively, transaction processing systems used by different merchants may have merchant-specific variations that result in changes to the merchant attribute provided with an authorization request. For example, a merchant that accepts credit card payments for an installment account may include details relating to the current installment in the merchant identifier (e.g., "XYZ installment 17 of 36") for user convenience. In these (and other) cases, inconsistent merchant attributes may appear in the transaction request, which may result in the authorization device incorrectly or falsely rejecting the request for the transaction authorization. Accordingly, in some implementations, the authorization device may enable the user device to review the inconsistent merchant attributes in order to authorize the transaction.

For example, as further shown in FIG. 1A, and by reference number 130, the authorization device may transmit, to the user device, a message that provides an option to authorize the inconsistent merchant attributes via a biometric override. In some implementations, the authorization device may temporarily delay the decision to decline or reject the request for the transaction authorization until the user has responded to the message that provides the option to authorize the inconsistent merchant details. Alternatively, in some implementations, the authorization device may process each transaction request independently, and the user device and/or the merchant device may reissue the request for the transaction authorization in cases where the biometric override is provided to authorize the inconsistent merchant attributes. In either case, the message that is transmitted to the user device may indicate the one or more inconsistencies between the merchant attribute provided in the request and the authorized merchant attribute associated with the merchant-bound payment credential such that the user of the user device can provide a biometric input to securely override the decision to decline or reject the transaction request. For example, the message that is transmitted to the user device may include a push notification that is transmitted to a biometric-enabled device belonging to the user associated with the primary credential that is linked to the merchant-bound payment credential. Additionally, or alternatively, in cases where the user is interacting with a non-biometric-enabled device, the authorization device may transmit information to the non-biometric-enabled device that causes the non-biometric-enabled device to display a prompt that includes an option to provide the biometric override. In this case, the authorization device may transmit the message that enables the biometric override to the biometric-enabled device based on the user selecting the option to provide the biometric override.

In some implementations, when transmitting the message that enables the biometric override and/or the prompt that includes the option to provide the biometric override, the message and/or prompt transmitted by the authorization device may indicate the differences between the authorized merchant attribute and the merchant attribute that was provided with the authorization request. Additionally, or alternatively, the message and/or prompt transmitted by the authorization device may include a recommendation as to whether the user should approve or disapprove the inconsistent merchant attributes. For example, in some implementations, the authorization device may be configured to search and/or gather data from one or more data sources that include information related to mergers, acquisitions, name changes, and/or other changes to merchant identifiers, and such information may be used to provide the recommendation based on whether the inconsistent merchant attributes appear to be attributable to a valid change to a merchant identifier. Additionally, or alternatively, the authorization device may determine a degree of similarity between the authorized merchant attribute and the merchant attribute provided with the authorization request, and the recommendation may be based on whether the degree of similarity satisfies (or fails to satisfy) a threshold. Additionally, or alternatively, the authorization device may generate the recommendation based on transactions associated with other user accounts. For example, if several users provide biometric overrides to authorize the same change(s) in merchant attributes, the authorization device may recommend that the user provide the biometric override to approve the inconsistent merchant attributes. Alternatively, in some implementations, the authorization device may automatically infer whether to approve or disapprove the inconsistent merchant attributes without prompting the user (e.g., if the user authorizes merchant attributes of "XYZ installment 15 of 36" and "XYZ installment 16 of 36", the authorization device may infer that merchant attributes of "XYZ installment 17 of 36" and so on are also authorized without repeatedly prompting the user to provide a biometric override in each instance).

As shown in FIG. 1B, and by reference number 135, the user of the user device may provide the biometric override to authorize the merchant attribute provided in the transaction request. For example, in some implementations, the user device may include a biometric-enabled device that includes one or more sensors having capabilities to receive biometric data. For example, the biometric data may generally include one or more physiological characteristics or one or more behavioral characteristics that are unique to the user that owns the primary credential linked to the merchant-bound payment credential such that the biometric data can be used to verify an identity of the user of the user device. For example, in some implementations, the physiological characteristics may include a fingerprint that may be detected using a fingerprint sensor (e.g., a capacitive or optical sensor), a facial mapping that may be detected using a facial recognition sensor (e.g., a dot projector module that projects infrared dots in a pattern onto a user's face and an infrared camera module that reads the pattern), an iris recognition obtained with an iris scanner that can measure the unique patterns in the colored circle of the eye, a retina scan obtained with a retina scanner that can measure the unique patterns in the blood vessels of the retina, a hand geometry, and/or other suitable physiological characteristics that are uniquely and/or permanently associated with the user. Additionally, or alternatively, the behavioral characteristics may include a gait, voice characteristics, a typing rhythm, keystroke dynamics, and/or a signature, among other examples. In some implementations, a biometric override may be provided to validate the identity of the user authorizing the change in merchant attributes, as biometric inputs are generally more secure than passwords or payment tokens that can be compromised (e.g., lost, stolen, and/or guessed).

As further shown in FIG. 1B, and by reference number 140, the authorization device may update the authorized merchant attributes that are associated with the merchant-bound payment credential based on the user of the user device providing the biometric override. For example, as shown be reference number 145, the authorization device may update the authorized merchant information associated with the merchant-bound payment credential to include the merchant attribute provided in the requested transaction. Additionally, or alternatively, the authorization device may replace the stored merchant attributes with the new merchant attribute, may maintain a previous binding between the merchant-bound payment credential and the stored merchant attributes and bind a new payment credential to the merchant attribute provided in the requested transaction, may bind a new payment credential to the merchant attribute provided in the requested transaction and delete the previous binding between the merchant-bound payment credential and the stored merchant attributes, provide the user with an option to select one or more actions to be performed to update the authorized merchant attributes that are associated with the merchant-bound payment credential, and/or infer the action(s) to be performed to update the authorized merchant attributes, among other examples. Furthermore, in some implementations, the authorization device may update global information associated with the merchant to reflect the different merchant attributes based on the biometric override. For example, in cases where a threshold number of users provide a biometric override to authorize the same difference(s) in merchant attributes, the authorization device may update the merchant attributes system-wide such that transaction requests associated with other users with the same or similar inconsistencies in merchant attributes are approved without prompting the other users.

Accordingly, as further shown in FIG. 1B, and by reference number 150, a new transaction using the merchant-bound payment credential associated with the user device may be authorized based on the updated merchant attributes. For example, as described above, the authorization device may temporarily delay the transaction associated with an authorization request while awaiting the biometric override from the user device based on the inconsistencies between the merchant attribute provided in the authorization request and the authorized merchant attributes that are associated with the merchant-bound payment credential. In this case, the authorization device may release the temporary delay and authorize the transaction based on updating the authorized merchant attributes to include the different merchant attributes provided in the earlier authorization request. Additionally, or alternatively, the merchant device may submit a new (subsequent) authorization request using the same transaction attributes that were provided in the earlier request that was declined or otherwise rejected (e.g., using the same merchant-bound payment credential and merchant attributes). For example, as shown by reference number 155, the authorization request may include the merchant attribute "ABC Co.," which match one of the entries stored at the authorization device, which correspond to an authorized merchant attribute for the merchant-bound payment credential. Accordingly, the authorization device may authorize the delayed transaction and/or the subsequent transaction based on the matching merchant attribute. In this way, a user may enter into a transaction with a particular merchant using a merchant-bound payment credential, such as a virtual credential linked to a primary credential, and may continue to use the merchant-bound payment credential for subsequent customer-initiated and/or merchant-initiated transactions in cases where one or more identifiers or other attributes associated with the merchant may change from time to time.

Alternatively, in some cases, the user may indicate that the different merchant attribute provided in the authorization request is not authorized. For example, the user may select an option to indicate that the merchant attribute does not correspond to an authorized merchant associated with the merchant-bound payment credential and/or may not respond to the prompt within a threshold duration, among other examples. In such cases, the authorization device may decline or otherwise reject the authorization request. Furthermore, in some implementations, the authorization device may create a record of the rejected authorization request, which the authorization device may reference to determine whether to automatically decline or reject subsequent authorization requests in which the merchant attribute has the same or similar discrepancies with respect to authorized merchant attributes. In some implementations, the authorization device may assign a higher weight to an explicit rejection of the different merchant attributes than an implicit rejection due to a failure to respond to the prompt.

As indicated above, FIGS. 1A-1B are provided as an example. Other examples may differ from what is described with regard to FIGS. 1A-1B.

Figure 2:
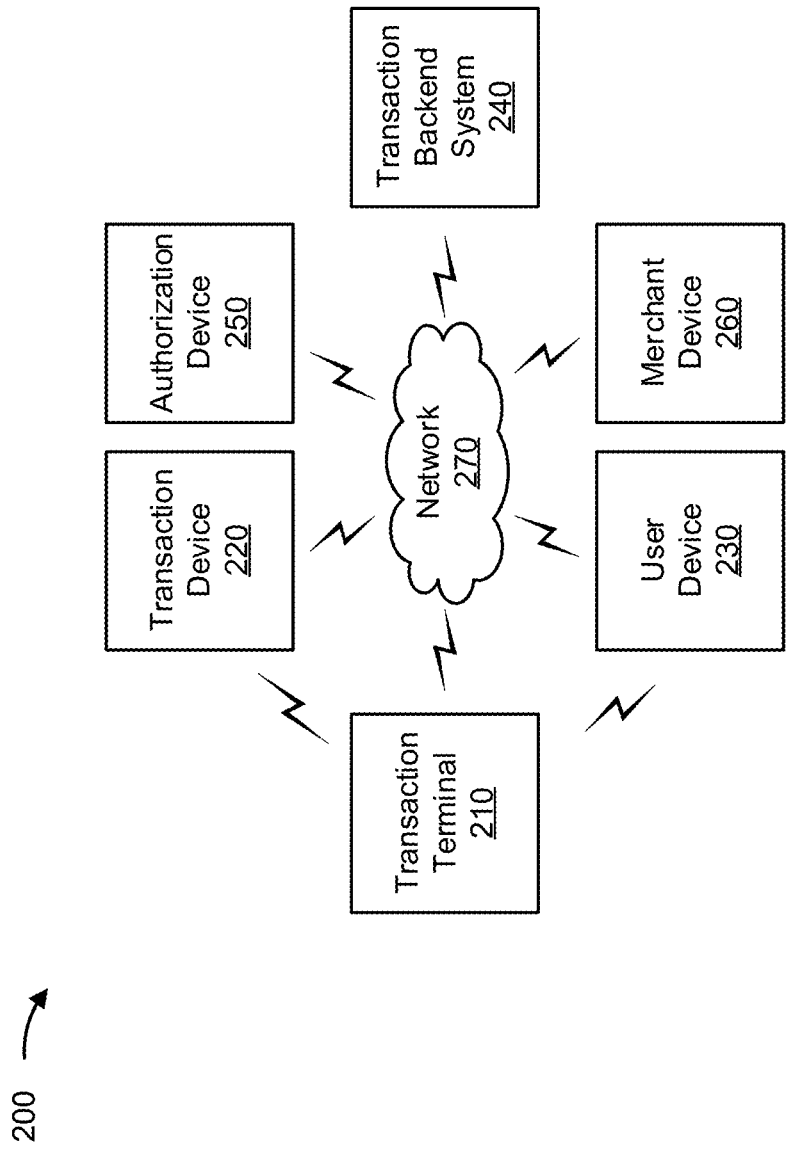
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, an authorization device 250, a merchant device 260, and/or a network 270. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

In some implementations, the account information associated with the transaction device may include a primary payment credential (e.g., a primary credit card number), and may further include one or more virtual payment credentials that are linked to the primary payment credential. For example, as described above, a virtual credential is a payment credential, associated with a user account, that allows a transaction to be performed without using the primary payment credential associated with the user account. For example, the virtual credential can be a virtual credit card number that can be used to conduct transactions associated with a user account (e.g., rather than using, and therefore exposing, an actual credit card number associated with the primary payment credential for the user account). In some cases, the virtual credential may be associated with a particular entity, such as a merchant (e.g., such that the virtual credential is valid for transactions associated with only the particular entity).

The user device 230 includes one or more devices capable of being used for an electronic transaction, as described above in connection with the transaction device 220. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Additionally, or alternatively, the user device 230 may be capable of receiving, generating, storing, processing, and/or providing information associated with a biometric for an incorrect failed authorization using a credential bound to a particular entity, as described elsewhere herein. For example, the user device 230 may include one or more biometric sensors that can receive a biometric input to authorize a transaction associated with a merchant attribute that includes one or more inconsistencies or discrepancies with respect to authorized merchant attributes for a credential bound to a particular entity. Additionally, or alternatively, the user device 230 may be associated with another device that includes one or more biometric sensors that can receive the biometric input to authorize the transaction associated with the merchant attribute.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The authorization device 250 includes one or more devices capable of processing, authorizing, and/or facilitating a transaction. For example, the authorization device 250 may be associated with the transaction backend system 240 and may include one or more servers and/or computing hardware (e.g., in a cloud computing environment or separate from a cloud computing environment) configured to receive and/or store information associated with processing an electronic transaction using one or more payment credentials. For example, the authorization device 250 may include one or more storage devices or storage components to store information related to one or more primary payment credentials associated with a user and one or more virtual or merchant-bound payment credentials that are linked to the one or more primary payment credentials. Accordingly, in some implementations, the authorization device 250 may receive an authorization request associated with a transaction, which may include one or more merchant attributes associated with a merchant-bound payment credential, and may determine whether to approve (e.g., permit, authorize, or the like) or decline (e.g., reject, deny, or the like) the authorization request based on the merchant attributes. Furthermore, in cases where there are one or more inconsistencies between the merchant attributes provided with the authorization request and the authorized merchant attributes associated with the merchant-bound payment credential, the authorization device 250 may transmit one or more messages to the user device 230 to enable the user device 230 to authorize (or disapprove, deny, reject, etc.) the different merchant attribute included in the authorization request.

The merchant device 260 includes one or more devices capable of requesting and/or processing a transaction. For example, the merchant device 260 may include a server, such as an application server, a client server, a web server, a database server, a host server, a proxy server, a virtual server (e.g., executing on computing hardware), or a server in a cloud computing system. In some implementations, the merchant device 260 may transmit, to the transaction backend system 240 and/or the authorization device 250, an authorization request that includes information related to a payment credential and one or more merchant attributes to identify a merchant associated with the merchant device 260. For example, as described above, the authorization request may relate to a consumer-initiated transaction and/or a merchant-initiated transaction, and the transaction backend system 240 and/or the authorization device 250 may generate a decision to decline or reject the authorization request in cases where the merchant attributes provided with the authorization request are inconsistent with authorized merchant attributes associated with the payment credential. In such cases, the transaction backend system 240 and/or the authorization device 250 may communicate with the user device 230 to enable an option to provide a biometric override to authorize or disapprove the difference in merchant attributes. Accordingly, the merchant device 260 may receive, from the transaction backend system 240 and/or the authorization device 250 information indicating whether the authorization request was granted or declined and/or whether to resubmit the authorization request based on whether the user device 230 provides a biometric input to override the inconsistent merchant attributes. In some implementations, the merchant device 260 may be included in, in communication with, and/or otherwise associated with the transaction terminal 210.

The network 270 includes one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the transaction terminal 210 may communicate with the transaction device 220 and/or the user device 230 using a first network (e.g., a contactless network or by coming into contact with the transaction device 220 and/or the user device 230) and may communicate with the transaction backend system 240 and/or the authorization device 250 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
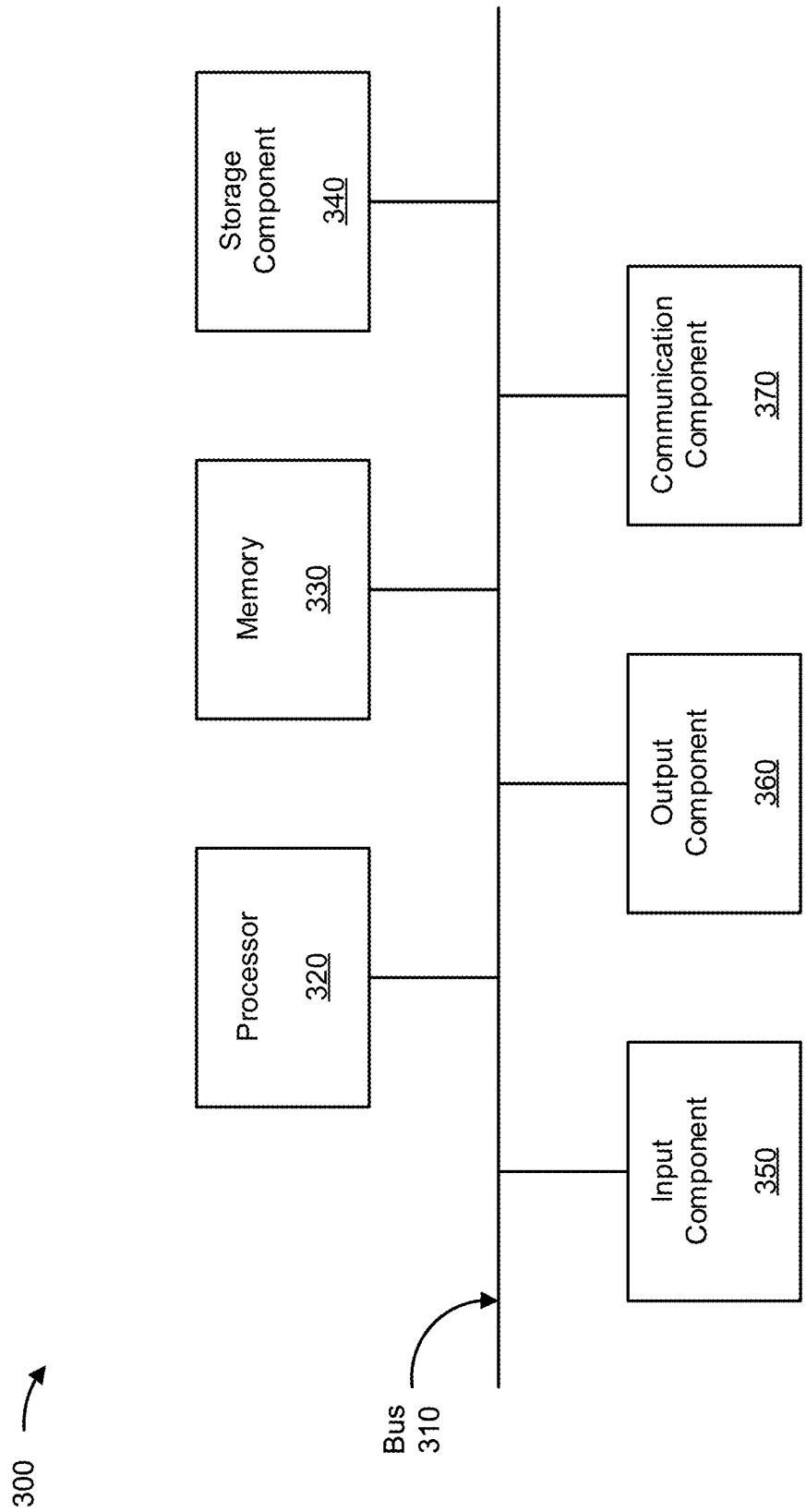
FIG. 3 is a diagram of example components of one or more devices of FIG. 2.

FIG. 3 is a diagram of example components of a device 300, which may correspond to transaction terminal 210, transaction device 220, user device 230, transaction backend system 240, authorization device 250, and/or merchant device 260. In some implementations, transaction terminal 210, transaction device 220, user device 230, transaction backend system 240, authorization device 250, and/or merchant device 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
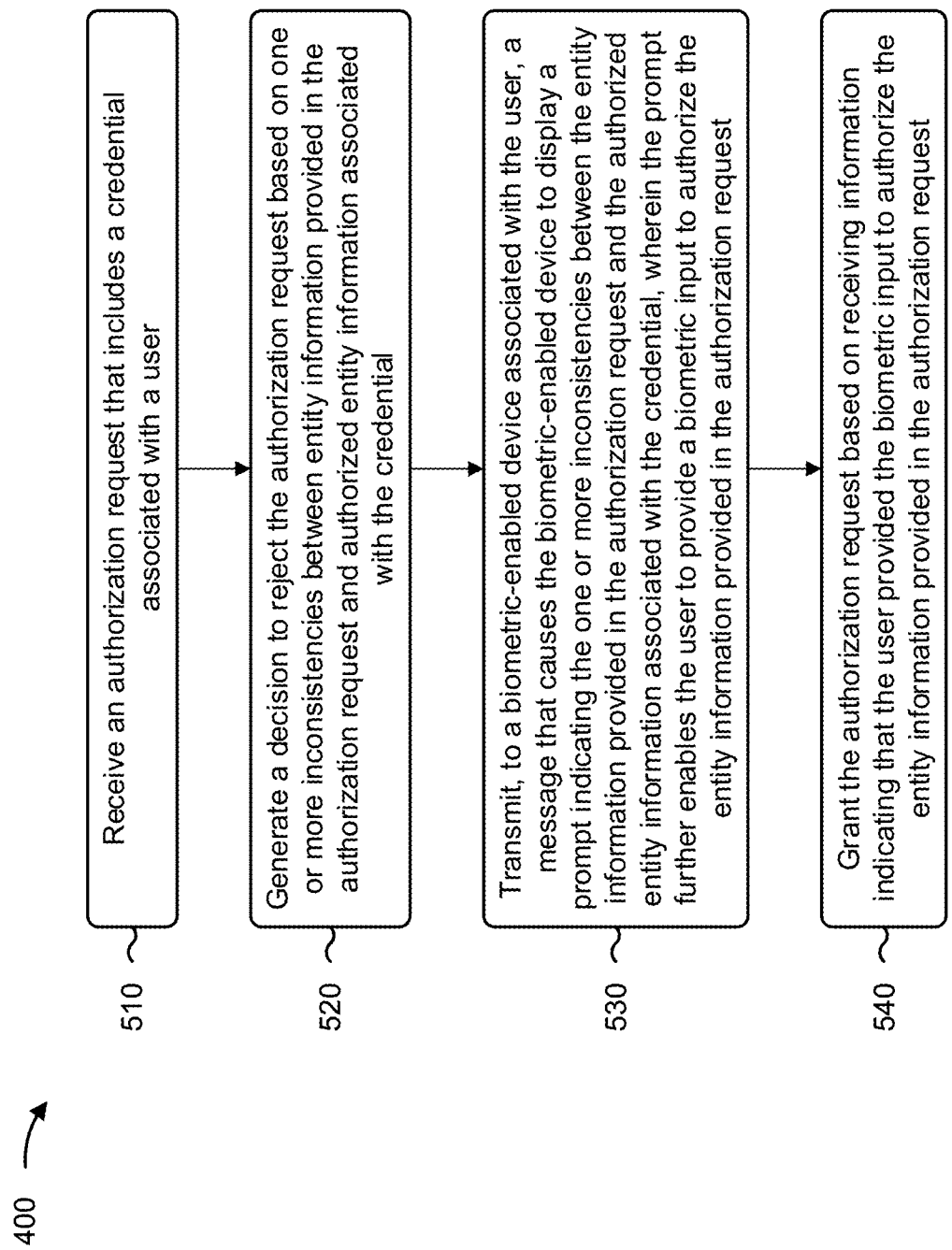
FIGS. 4-5 are flowcharts of example processes relating to a biometric override for an incorrect failed authorization.

FIG. 4 is a flowchart of an example process 400 associated with a biometric override for an incorrect failed authorization. In some implementations, one or more process blocks of FIG. 4 may be performed by an authorization device (e.g., authorization device 250). In some implementations, one or more process blocks of FIG. 4 may be performed by another device or a group of devices separate from or including the authorization device, such as transaction terminal 210, transaction device 220, user device 230, transaction backend system 240, and/or merchant device 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an authorization request that includes a credential associated with a user (block 410). As further shown in FIG. 4, process 400 may include generating a decision to reject the authorization request based on one or more inconsistencies between entity information provided in the authorization request and authorized entity information associated with the credential (block 420). As further shown in FIG. 4, process 400 may include transmitting to a biometric-enabled device associated with the user, a message that causes the biometric-enabled device to display a prompt indicating the one or more inconsistencies between the entity information provided in the authorization request and the authorized entity information associated with the credential (block 430). In some implementations, the prompt further enables the user to provide a biometric input to authorize the entity information provided in the authorization request. As further shown in FIG. 4, process 400 may include granting the authorization request based on receiving information indicating that the user provided the biometric input to authorize the entity information provided in the authorization request (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
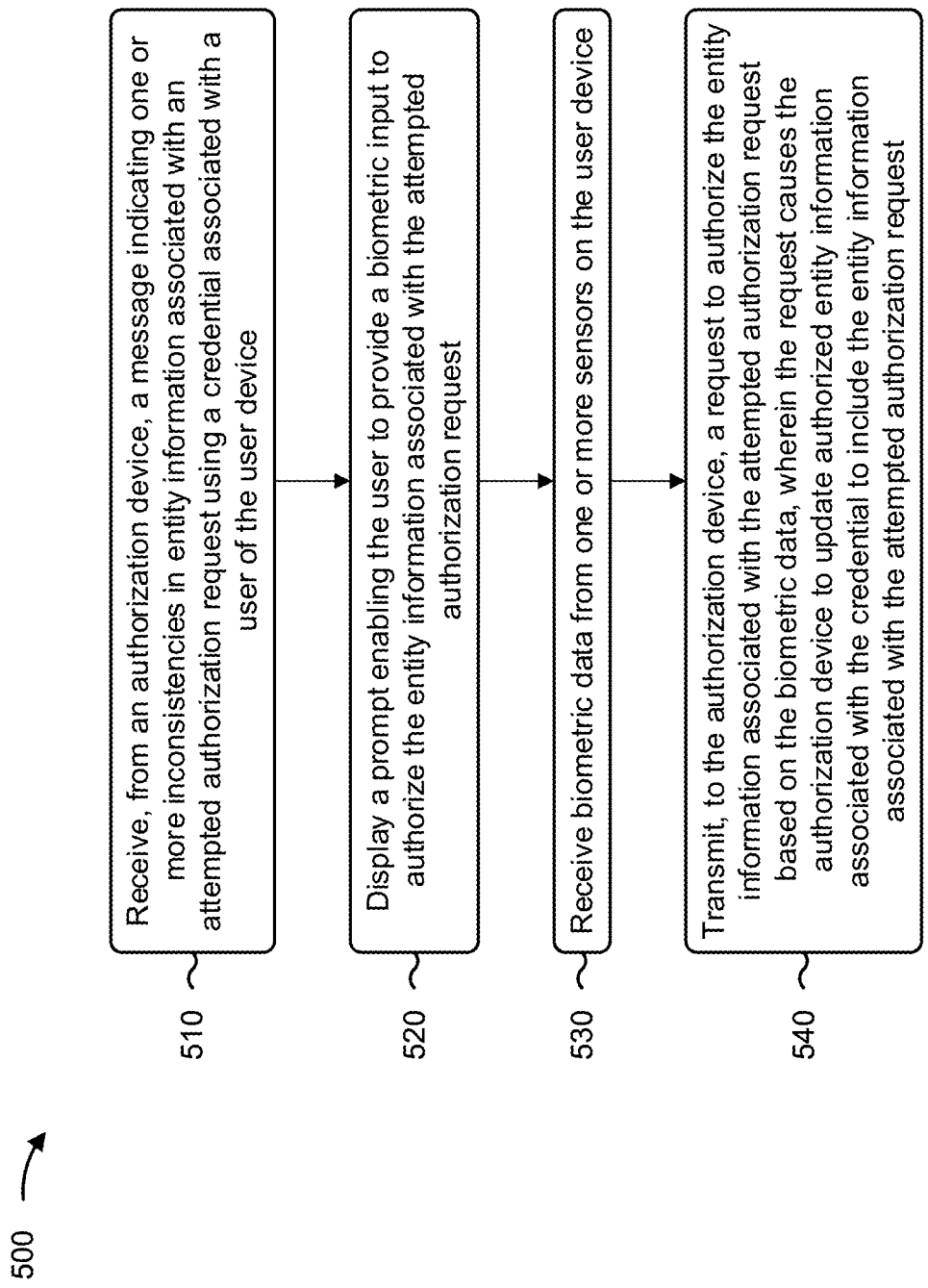

FIG. 5 is a flowchart of an example process 500 associated with a biometric override for an incorrect failed authorization. In some implementations, one or more process blocks of FIG. 5 may be performed by a user device (e.g., user device 230). In some implementations, one or more process blocks of FIG. 5 may be performed by another device or a group of devices separate from or including the user device, such as transaction terminal 210, transaction device 220, transaction backend system 240, authorization device 250, and/or merchant device 260. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving, from an authorization device, a message indicating one or more inconsistencies in entity information associated with an attempted authorization request using a credential associated with a user of the user device (block 510). As further shown in FIG. 5, process 500 may include displaying a prompt enabling the user to provide a biometric input to authorize the entity information associated with the attempted authorization request (block 520). As further shown in FIG. 5, process 500 may include receiving biometric data from one or more sensors on the user device (block 530). As further shown in FIG. 5, process 500 may include transmitting, to the authorization device, a request to authorize the entity information associated with the attempted authorization request based on the biometric data (block 540). In some implementations, the request causes the authorization device to update authorized entity information associated with the credential to include the entity information associated with the attempted authorization request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for enabling a biometric override for a failed authorization attempt, the system comprising:
   one or more memories; and
   one or more processors, communicatively coupled to the one or more memories, configured to:
      reject an authorization request that includes a credential associated with a user based on one or more inconsistencies between entity information provided in the authorization request and authorized entity information associated with the credential,
 wherein the authorization request is an initial authorization request;
transmit, to a device associated with the user, a message prompting the user to provide a biometric input to authorize the entity information provided in the authorization request,
 wherein the message causes the device to display an interface indicating that the authorization request was rejected based on the one or more inconsistencies between the entity information provided in the authorization request and the authorized entity information associated with the credential;
update the authorized entity information associated with the credential to include the entity information provided in the authorization request based on the user providing the biometric input to authorize the entity information provided in the authorization request;
receive a subsequent authorization request that includes the credential associated with the user,
 wherein the subsequent authorization request includes the entity information provided in the initial authorization request; and
authorize the subsequent authorization request based on updating the authorized entity information to include the entity information provided in the initial authorization request.

2. The system of claim 1, wherein the biometric input indicates one or more physiological characteristics or one or more behavioral characteristics associated with the user.

3. The system of claim 2, wherein the one or more physiological characteristics include one or more of a fingerprint, a facial mapping, an iris pattern, a retina pattern, or a hand geometry associated with the user.

4. The system of claim 2, wherein the one or more behavioral characteristics include one or more of a gait, voice characteristics, a typing rhythm, keystroke dynamics, or a signature.

5. The system of claim 1, wherein the one or more processors are further configured to:
cause a transaction associated with the authorization request to be temporarily delayed while awaiting the biometric input based on the one or more inconsistencies between the entity information provided in the authorization request and the authorized entity information associated with the credential; and
authorize the transaction based on updating the authorized entity information to include the entity information provided in the authorization request.

6. The system of claim 1, wherein the authorization request is a first authorization request, the user is a first user, and the one or more processors are further configured to:
receive a second authorization request that includes a credential associated with a second user;
 wherein the second authorization request includes the entity information provided in the first authorization request;
determine one or more inconsistencies between the entity information provided in the second authorization request and authorized entity information linked to the credential associated with the second user; and
authorize the second authorization request based on the biometric input and a similarity between the authorized entity information associated with the credential for the first user and the authorized entity information associated with the credential for the second user.

7. The system of claim 1, wherein the credential includes a virtual credential that is associated with the user and bound to a particular entity.

8. The system of claim 1, wherein the credential is one of a plurality of virtual credentials associated with a same account identifier that is associated with the user.

9. A method for enabling a biometric override for a failed authorization attempt, comprising:
receiving, by an authorization device, an authorization request that includes a credential associated with a user,
 wherein the authorization request is a first authorization request, the user is a first user;
generating, by the authorization device, a decision to reject the authorization request based on one or more inconsistencies between entity information provided in the authorization request and authorized entity information associated with the credential;
transmitting, by the authorization device, to a biometric-enabled device associated with the user, a message that causes the biometric-enabled device to display a prompt indicating the one or more inconsistencies between the entity information provided in the authorization request and the authorized entity information associated with the credential,
 wherein the prompt further enables the user to provide a biometric input to authorize the entity information provided in the authorization request;
granting, by the authorization device, the authorization request based on receiving information indicating that the user provided the biometric input to authorize the entity information provided in the authorization request;
receiving, by the authorization device, a second authorization request that includes a credential associated with a second user,
 wherein the second authorization request includes the entity information provided in the first authorization request;
determining, by the authorization device, one or more inconsistencies between the entity information provided in the second authorization request and authorized entity information linked to the credential associated with the second user; and
authorizing, by the authorization device, the second authorization request based on the biometric input and a similarity between the authorized entity information associated with the credential for the first user and the authorized entity information associated with the credential for the second user.

10. The method of claim 9, further comprising:
updating the authorized entity information associated with the credential to include the entity information provided in the authorization request based on the user providing the biometric input to authorize the entity information provided in the authorization request.

11. The method of claim 10, wherein the authorization request is granted based on a subsequent authorization request including entity information that matches the updated authorized entity information associated with the credential.

12. The method of claim 10, further comprising:
causing a transaction associated with the authorization request to be temporarily delayed while awaiting the biometric input based on the one or more inconsistencies between the entity information provided in the authorization request and the authorized entity information associated with the credential,
wherein the authorization request is granted to approve the transaction based on updating the authorized entity information to include the entity information provided in the authorization request.

13. The method of claim 9, wherein the credential includes a virtual credential that is associated with the user and bound to a particular entity.

14. The method of claim 9, further comprising:
transmitting, to a non-biometric-enabled device associated with the user, information that causes the non-biometric-enabled device to display a prompt that includes an option to provide the biometric input to authorize the entity information provided in the authorization request,
wherein the message that causes the biometric-enabled device to display the prompt that enables the user to provide the biometric input is transmitted to the biometric-enabled device based on the user selecting the option.

15. A non-transitory computer-readable medium storing a set of instructions, the set of instructions comprising:
one or more instructions that, when executed by one or more processors of a user device, cause the user device to:
receive, from an authorization device, a message indicating one or more inconsistencies in entity information associated with an attempted authorization request using a credential associated with a user of the user device,
wherein the attempted authorization request is an initial authorization request;
display a prompt enabling the user to provide a biometric input to authorize the entity information associated with the attempted authorization request;
receive biometric data from one or more sensors on the user device;
transmit, to the authorization device, a request to authorize the entity information associated with the attempted authorization request based on the biometric data,
wherein the request causes the authorization device to update authorized entity information associated with the credential to include the entity information associated with the attempted authorization request;
receive a subsequent authorization request that includes the credential associated with the user,
wherein the subsequent authorization request includes the entity information provided in the initial authorization request; and
authorize the subsequent authorization request based on updating the authorized entity information to include the entity information provided in the initial authorization request.

16. The non-transitory computer-readable medium of claim 15, wherein the prompt includes a recommendation with respect to whether to authorize the entity information.

17. The non-transitory computer-readable medium of claim 16, wherein the recommendation is based on a degree of similarity between the entity information associated with the attempted authorization request and the authorized entity information associated with the credential.

18. The non-transitory computer-readable medium of claim 15, wherein the prompt includes an option to generate a new credential to be bound to the entity information associated with the attempted authorization request.

19. The non-transitory computer-readable medium of claim 15, wherein the message includes a push notification from the authorization device.

20. The system of claim 1, wherein the credential is configured to be associated with a particular merchant using the authorized entity information.

* * * * *